H. W. RAMBUSCH.
MEANS OF LIGHTING CHURCHES.
APPLICATION FILED MAY 7, 1921.

1,412,541.

Patented Apr. 11, 1922.

INVENTOR
HAROLD W. RAMBUSCH

BY Arthur Middleton
ATTORNEY

UNITED STATES PATENT OFFICE.

HAROLD W. RAMBUSCH, OF BROOKLYN, NEW YORK, ASSIGNOR TO RAMBUSCH DECORATING COMPANY, OF NEW YORK, N. Y.

MEANS OF LIGHTING CHURCHES.

1,412,541.  Specification of Letters Patent.  Patented Apr. 11, 1922.

Application filed May 7, 1921. Serial No. 467,723.

*To all whom it may concern:*

Be it known that I, HAROLD W. RAMBUSCH, a citizen of the United States, residing at Brooklyn, in the county of Kings and State of New York, have invented certain new and useful Improvements in Means of Lighting Churches, of which the following is a specification.

This invention relates to church lighting with especial reference to illuminating the attempts have been made to illumine the sanctuary and altar therein. Heretofore, sanctuary by hiding the source of light behind the pillars and the like but this is unsatisfactory because it is undesirable to have hidden things about a church or to have the worshippers in the church deceived as to the location of the source of the sanctuary illuminating light. Other attempts have been made by placing the lamps in plain view but they are unsightly, they are difficult to reach to take care of or clean, they are usually inharmonious with the decoration of the church, they are not adjustable, and they cause a detrimental and unpleasant glare in the eyes of the audience.

To meet these objections, my invention consists in having one or more sources of powerful light equipped with reflectors and mounted for adjustment so the light therefrom may be directed that the sanctuary and the altar therein, is brightly and uniformly illuminated. The sources of light are located on the pillars or walls where they can be used to best illuminating advantage and where they would ordinarily be in plain view of the audience. Then my invention includes the interposing between these sources of light and the audience, translucent holders, screens or casings which are decorated and designed to correspond with the plan of decoration of the church. These holders or screens are preferably of stained glass and worked up into beautiful patterns. These screens house the sources of bright light on three sides and as the light sources are further housed in reflectors, no light is projected rearwardly through the screens so if the invention stopped here, the present objection to a hidden source of light would apply just as much to my plan but to overcome this I provide small or low power electric lights and arrange them to throw their subdued light rearwardly through the screen toward the audience. These small lights illuminate the screen enough to convey clearly to the audience that these screens contain the sources of the bright light projected into the sanctuary and yet the light passing to the audience is so slight and so subdued by the colored glass that there is created no glare whatever.

I have shown herein the best embodiment of my invention of which I am at present informed but it is to be understood that it is shown in an illustrative and not a limiting sense for obviously my invention may take many embodiments without departing from its scope herein contemplated.

This invention is illustrated in the accompanying drawings in which

Figure 1:
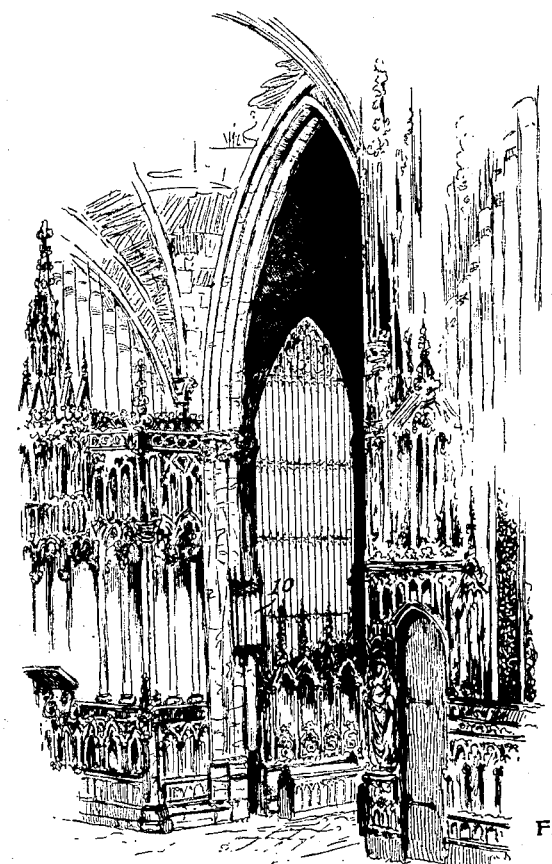
Figure 1 shows an elevation of a church sanctuary giving a view of the altar, and showing the location of my lighting system in place.
Figure 2:
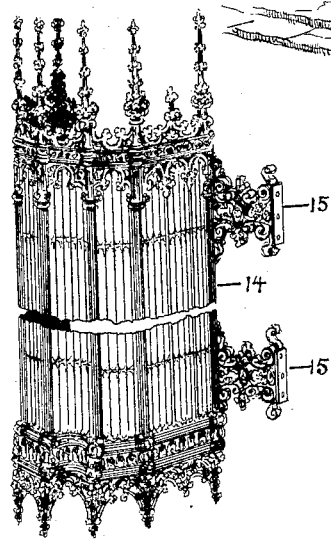
Fig. 2 shows a front elevation of one form of the screen of the invention.
Figure 3:
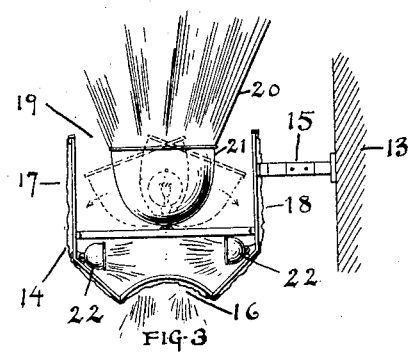
Fig. 3 is a cross sectional view taken along the lines 3—3 in Fig. 2.

In the drawings, the altar of the church is in the sanctuary the outer limit of which is defined by columns or arches 13. Supported from the arch 13, I provide a lighting fixture 10 having a casing, holder, or screen 14, which may be spaced from the arch 13 by means of arms or brackets 15. Or the screens may be suspended from the ceiling or roof. The screen is trough shaped or three sided so that it has a front face 16 (preferably made concave), that is, a face toward the audience, and two side faces 17 and 18. The screen is translucent and preferably made of stained glass, the pattern and color of the glass and the general design of the screen being such as to fit into or blend with the decoration of the church. A crown-like decoration may be added to the screen to set it off and the brackets 15 may be ornate in any style desired, it being preferred that this screen be made very beautiful.

The fourth side or face 19 of the screen is open and within the screen are located powerful lights 20 provided with adjustably mounted reflectors 21 capable of throwing light into the sanctuary wherever desired. The reflectors 21 house the lights 20 so that they are directed solely toward the sanctuary and no light is projected rearwardly to the audience. Then within the screen, I provide one or more low powered lights 22 which are adapted to project a delicate light through the translucent screen (which is further diffused by the concavity of the face 19) whereby it is illuminated to an extent that no glare results. Thereby, the audience sees the beautiful and ornamental illuminated glareless screens and clearly understands, without deception, that they contain the sources of brilliant light which illuminate the sanctuary and altar.

What I claim is:

1. In combination with a church having a sanctuary, an ornamental vertical screen, supporting means for the screen whereby it can be supported in view of the church audience and adjacent the sanctuary, a flood light mounted in said screen for illuminating the sanctuary, said screen being open at its sanctuary side, said flood light having an opaque reflector adapted to restrict the light from said flood light from going elsewhere than into the sanctuary and a non-dazzling glareless light in said screen between said reflector and said screen for indicating to the audience the source of the flood light.

2. In combination with a church having a sanctuary, an ornamental vertical screen, lateral supporting means for the screen whereby it can be supported in view of the church audience and adjacent the sanctuary, an adjustably mounted flood light in said screen for illuminating the sanctuary, said screen being open at its sanctuary side to permit of a desired adjustment of said flood light, said flood light having an opaque reflector adapted to restrict the light from said flood light from going elsewhere than into the sanctuary, and a non-dazzling glareless light in said screen between said reflector and said screen for indicating to the audience the source of the flood light.

In testimony whereof I affix my signature.

HAROLD W. RAMBUSCH.